United States Patent [19]

Watanabe et al.

[11] Patent Number: 4,733,344
[45] Date of Patent: Mar. 22, 1988

[54] DATA PROCESSING APPARATUS FOR CONTROLLING READING OUT OF OPERANDS FROM TWO BUFFER STORAGES

[75] Inventors: Masaya Watanabe; Shuichi Abe, both of Hadano, Japan

[73] Assignee: Hitachi, Ltd., Tokyo, Japan

[21] Appl. No.: 813,153

[22] Filed: Dec. 24, 1985

[30] Foreign Application Priority Data

Dec. 29, 1984 [JP] Japan .............................. 59-279657

[51] Int. Cl.[4] .............................................. G06F 9/34
[52] U.S. Cl. .................................................. 364/200
[58] Field of Search ...................... 364/200 MS File

[56] References Cited

U.S. PATENT DOCUMENTS 3,737,866  6/1973  Gruner ............................. 364/200
4,319,324  3/1982  Johnson et al. ................... 364/200

Primary Examiner—Thomas M. Heckler
Attorney, Agent, or Firm—Antonelli, Terry & Wands

[57] ABSTRACT

The data processing apparatus has first and second storages each independently accessible. An instruction unit applies a fetch request on a one-operand instruction to the first storage, and a fetch request on a two-operand instruction to the first and second storages. In case of a fetch request on a two-operand instruction, a storage control unit instructs the instruction unit to produce again a fetch request if one of the first and second storages is busy, and execute reading the operands in the order of decoding of instructions.

3 Claims, 8 Drawing Figures

| | INPUT | | | OUT-PUT |
|---|---|---|---|---|
| O SERIES STATUS TRANSITION CKT. 18-1 | 25-1 | 26-1 | 27-1 | 28-1 |
| I SERIES STATUS TRANSITION CKT. 18-2 | 25-2 | 26-2 | 27-2 | 28-2 |
| | X | X | 2 | 1 |
| | X | X | 1 | 0 |
| | 0 | 0 | 0 | 0 |
| | 1 | X | 0 | 2 |
| | X | 1 | 0 | 2 |

DATA PROCESSING APPARATUS FOR CONTROLLING READING OUT OF OPERANDS FROM TWO BUFFER STORAGES

BACKGROUND OF THE INVENTION

The present invention relates to a data processing apparatus for a pipeline mode system which has a plurality of storages each accessible independently, and more particularly to a data processing apparatus featuring the control of the reading of operands from plural buffer storages.

In data processing apparatus requiring high speed processing, both a pipeline system and a buffer storage system are commonly employed. In the pipeline system, the sequence of processing an instruction is divided into a plurality of steps such as instruction fetch, decoding, address translation, operand fetch, and execution. Several instructions are executed simultaneously by overlapping the execution of these steps. In the buffer storage system, high speed buffer storages are provided, in addition to the main storage, to store those instructions frequently used in the main storage and the copies of data. When a memory reference request is given, an instruction or data to be used is obtained by accessing the buffer storages.

In the data processing apparatus adopting both a pipeline system and a buffer storage system, simultaneously with the memory reference process to the buffer storage, succeeding instructions are sequentially decoded to request reading operands from the buffer storage. However, if the buffer storage is busy when a memory reference process is requested, the following process of an operand read request cannot be executed. Therefore, a means for repeating the request to read the operand becomes necessary.

Furthermore, in case of an instruction requesting two operands at the same time, such as a multi-instruction having an SS instruction format (instruction format executing the operation from the main storage to the main storage) and a vector instruction, it is necessary to access the buffer storage two times. In order to improve the efficiency of processing such an instruction, a pipeline system having one cycle pitch per one command has been proposed (e.g., Japanese Patent Examined Publication No. 47-29332), wherein the buffer storage is divided into two portions and each portion is independently accessible. The provision of two buffer storages, each being independently accessed to read the operand, however, introduces new problems such as the need to supervise the busy/free status of the buffer storages and to provide a means for repeating the request to read the operand if the buffer storage is busy. In addition, it becomes necessary to consider the sequence of processing of reading operands.

SUMMARY OF THE INVENTION

The object of the present invention is to provide a data processing apparatus wherein the reading of operands from two storages is processed in the order of decoding instructions so that delay in the reading of an operand is prevented.

According to an aspect of the present invention, an instruction unit instructs a storage control unit to judge whether an operand read instruction is a one-operand instruction or a two-operand instruction. The storage control unit determines the busy/free status of one or both storages and decides if an operand read request is enabled or not. In case of a busy status, the storage control unit transfers a re-request signal to the instruction unit, which in response to the re-request signal, outputs again an operand read request in the order of decoding instructions.

DESCRIPTION OF THE PREFERRED EMBODIMENT

Figure 1:
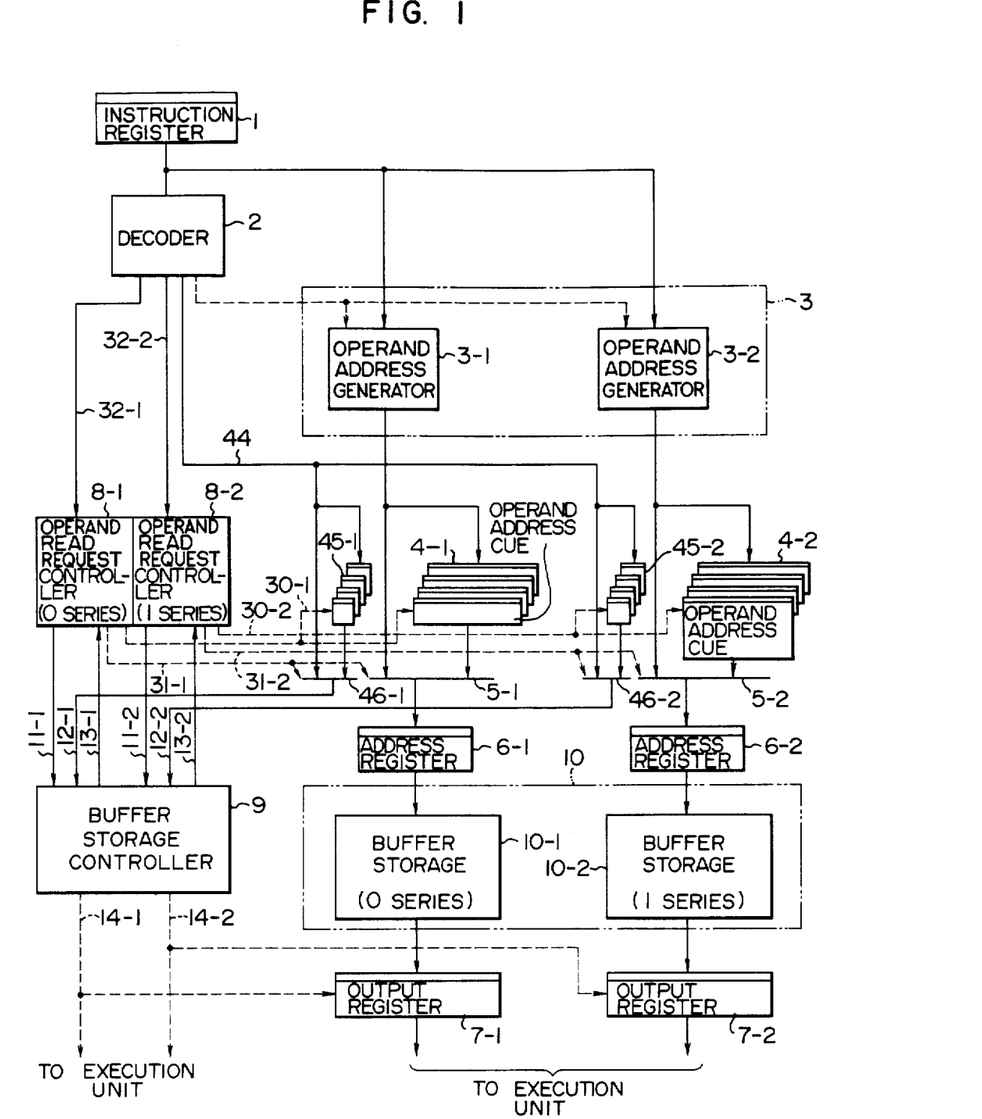
FIG. 1 is a block diagram showing an embodiment of the data processing apparatus according to the present invention.

FIG. 1 is a block diagram showing an embodiment of the data processing apparatus according to the present invention. In the figure, an instruction is set to an instruction register 1. The instruction has been derived from the instructions fetched from a buffer storage or a main storage and cued at an instruction buffer (now shown). A decoder 2 decodes the instruction (instruction code). A unit 3 receives the operand part of the instruction and calculates the operand address. The unit 3 is constructed of two operand address generators 3-1 and 3-2. The operand address generators 3-1 and 3-2 are under control of the decoder 2. In case of an instruction requesting one memory operand, at all times the operand address generator 3-1 generates the operand address, while in case of an instruction requesting two operands, the address generators 3-1 and 3-2 generate two operand addresses at the same time.

Operand address cues 4-1 and 4-2 are associated with the corresponding operand address generators 3-1 and 3-2. Each cue 4-1, 4-2 is constructed of four address registers. An operand address generated by the operand address generator 3-1 is stored in one of the address registers of the operand address cue 4-1, identified by a set signal 30-1 (to be described later) sent from an operand read request controller 8-1. The operand address cue 4-2 is similarly controlled by a set signal 30-2 (to be described later) sent from an operand read request controller 8-2.

Reference numerals 5-1 and 5-2 each represent a selector. The selector 5-1 is a five-input and one-output selector selecting either an operand address generated by the operand address generator 3-1 or an operand address stored in an address register of the operand address cue 4-1. An operand address to be selected is identified by the operand read request control unit 8-1. The operand address selected by the selector 5-1 is stored in a buffer storage address register 6-1. The operand address selected by the selector 5-2 is similarly stored in a buffer storage address register 6-2.

A buffer storage unit 10 is constructed of buffer storages 10-1 and 10-2 each independently accessible having the same construction. The buffer storage 10-1 is referred to as being of the 0 series, while the buffer storage 10-2 is referred to as being of the 1 series, hereinafter where applicable. Also the resources associated with the buffer storage 10-1 are referred to as being of the 0 series, while those with the buffer storage 10-2 are referred to as being of the 1 series.

A buffer storage output register 7-1 is set with the contents read out of the buffer storage 10-1, while a buffer storage output register 7-2 is set with the contents read out of the buffer storage 10-2. The contents read out of the output registers 7-1 and 7-2 are transferred to an unrepresented execution unit.

Reference numerals 8-1 and 8-2 represent the 0 series and 1 series operand read controllers, respectively. The 0 series operand read controller 8-1 makes a 0 series request 11-1 "1" to request a buffer storage controller 9 to read an operand from the 0 series buffer storage 10-1. The 1 series operand read controller 8-2 makes a 1 series request 11-1 "ON" to request the buffer storage controller 9 to read an operand from the 1 series buffer storage 10-2.

The operand read requests by the operand read controllers 8-1 and 8-2 are classified into two types.

A first type request is produced based on the result of decoding an instruction by the instruction decoder 2. Such a request is referred to as an IROF request hereinafter. To distinguish the 0 and 1 series, the requests are referred to as the 0 series IROF request and 1 series IROF request, respectively. When a 0 series request 11-1 corresponding to the 0 series IROF request is produced, the buffer storage controller 9 judges if the 0 series buffer storage 10-1 can execute an operand read process. If possible, the process is executed. If not possible, the buffer storage controller 9 makes a 0 series re-request signal 13-1 "1" to notify the 0 series operand read request controller 8-1 of the effect that it is necessary to produce again a 0 series re-request.

A second type request is produced in response to re-request signals 13-1 and 13-2. Such a request is referred to as a RDOF request hereinafter. To distinguish the 0 and 1 series, the requests are referred to as a 0 series RDOF request and a 1 series RDOF request, respectively. The buffer storage controller 9 operates similarly in response to both a IROF request and a RDOF request. In particular, when a 0 series request 11-1 corresponding to the 0 series RDOF request is produced, the buffer storage controller 9 executes a process similarly to the above-described IROF request. If it is judged impossible to execute a process, the buffer storage controller 9 produces again a 0 series re-request signal. A 0 series RDOF request continues to be produced until the request is allowed by the buffer storage controller 9 or until the request is cancelled. The same operation is also performed in the 1 series.

Figure 2:
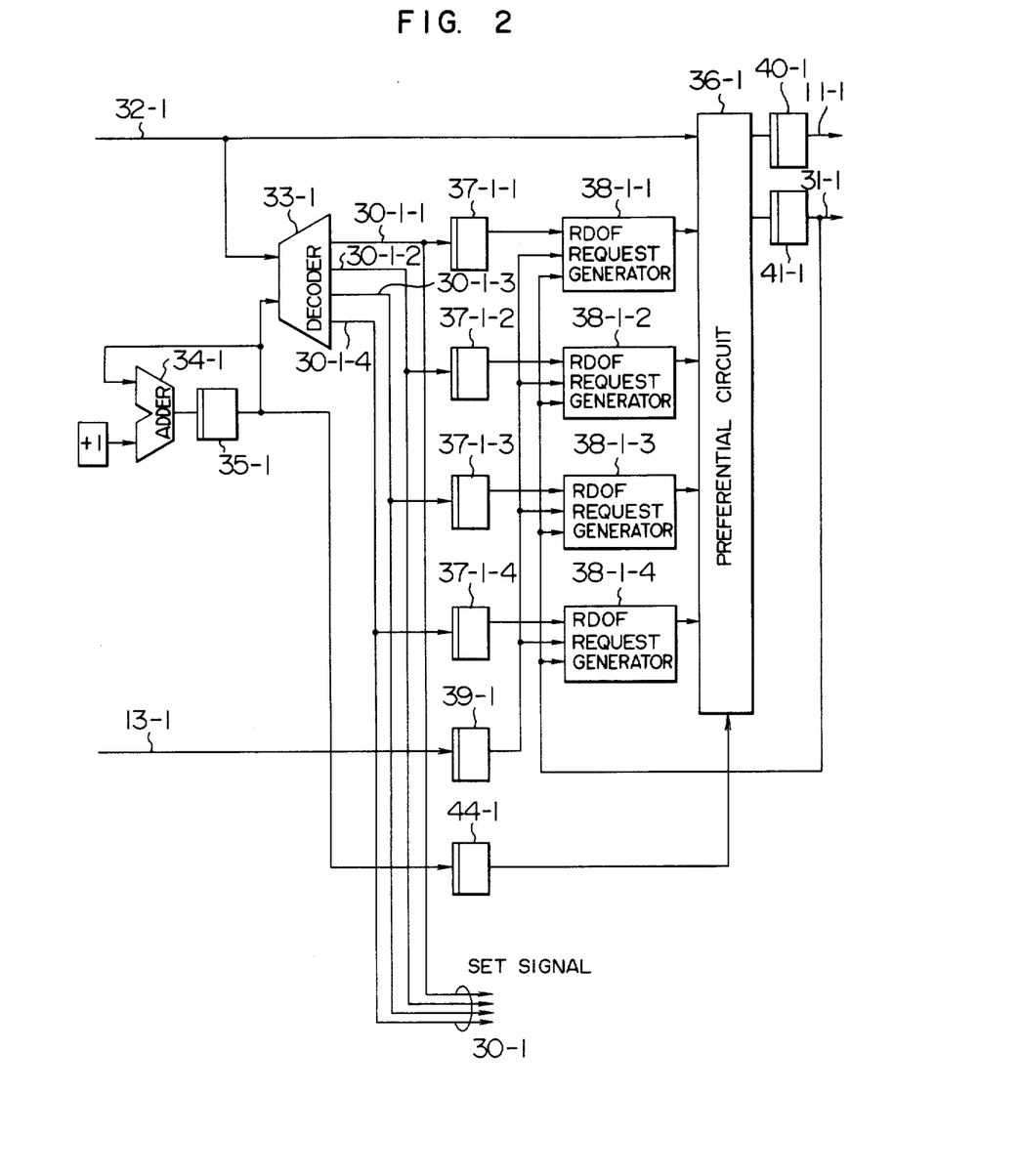
FIG. 2 shows in detail the operand read request control unit of FIG. 1.

The detail of the 0 series operand read controller 8-1 is shown in FIG. 2. The detail of the 1 series also is the same as that of FIG. 2. The description is therefore directed only to the 0 series hereinbelow.

In FIG. 2, reference numeral 33-1 represents a decoder, 34-1 stands for a +1 adder, 38-1-1 to 38-1-4 for RDOF request generators, 36-1 for a preferential circuit, 37-1-1 to 37-1-4, 39-1 and 40-1 for flip flops, 35-1 for an input pointer, and 41-1 and 44-1 for registers.

As described previously, in case an operand is read from the 0 series based upon the decoded instruction by the decoder 2, the control signal 32-1 is made "1" so that the decoder 33-1 decodes a signal from the input pointer 35-1 to make one of the set signals 30-1-1 to 30-1-4 "1". At the next cycle, a corresponding one of the flip-flops 37-1-1 to 37-1-4 is made ON so that the input pointer 35-1 is renewed by adding 1 by the adder 34-1. That is, in the order of receiving control signals 32-1, the flip-flops 37-1-1 to 37-1-4 are sequentially set.

All of the RDOF request generators 38-1-1 to 38-1-4 are sequential circuits having the same circuit construction, corresponding to the respective address registers of the operand address cue 4-1. The RDOF request generators 38-1-1 to 38-1-4 are actuated upon turning ON of the corresponding flip-flops 37-1-1 to 37-1-4. The status of the flip-flops remains unchanged until a request is allowed by the buffer storage controller 9, thereby controlling generation of an RDOF request. The flip-flop 39-1 latches a 0 series re-request signal produced by the buffer storage controller 9. Each of the RDOF request generators 38-1-1 to 38-1-4 is reset at the second next cycle after a 0 series request 11-1 was produced for actuating the generator, on condition that the request was allowed by the buffer storage controller 9 which is confirmed by turning OFF of the flip-flop 39-1. If the flip-flop 39-1 is ON, the RDOF request generator produces a RDOF request. The register 44-1 transfers the value of the input pointer 35-1 to the preferential circuit 36-1.

The preferential circuit 36-1 receives an IROF request generated from the decoder 2 and RDOF requests generated from the RDOF request generators 38-1-1 to 38-1-4. In accordance with a predetermined preferential order, the circuit 36-1 selects a most preferential request and sets at the next cycle the flip-flop 40-1 and register 41-1. The preferential circuit 36-1 selects the RDOF request generators in the order of increasing reference numbers thereof starting from that of the RDOF request generator set with the first control signal 32-1 identified by the register 44-1. The flip-flop 40-1 produces a 0 series request 11-1, while the register 41-1 produces a code representative of the original location selected by the preferential circuit 36-1, i.e., any one of the decoder 2 and the RDOF request generators 38-1-1 to 38-1-4. The output of the register 41-1, i.e., a select signal 31-1, is transferred to the selector 5-1 to select the read address associated with the 0 series.

Referring back to FIG. 1, the decoder 2 issues the control signal "1" when it decodes an instruction of a two-operand instruction type. 0 series and 1 series synchro instruction signal cues 45-1 and 45-2, each constructed of four 1 bit flip-flops, store the control signal. The synchro instruction signal cues 45-1 and 45-2 are controlled similarly as the operand address cues 4-1 and 4-2. The cues 45-1 and 45-2 receive the control signal 44 in response to set signals 30-1 and 30-2, and selectors 46-1 and 46-2 output a signal in response to select signals 31-1 and 31-2. The outputs of the selectors 46-1 and 46-2 are transferred to the buffer storage controller 9 respectively as a 0 series synchro instruction signal 12-1 and a 1 series synchro instruction signal 12-2. Under the above-noted control for reading the operands of a two-operand instruction (IROF request and RDOF request), the 0 and 1 series synchro instruction signals 12-1 and 12-2 become "1".

Next, the operation of reading operands will be described by reference to FIG. 1.

Assuming that an instruction having a single operand (instruction such as one having RX, RS and SI formats) is set at the instruction register 1, the decoder 2 decodes the instruction code from the instruction register 1 and actuates only the operand address generator 3-1. The operand address generator 3-1 actuated by the decoder 2 receives the operand code from the instruction register 1 and calculates the operand address to apply it via the selector 5-1 to the buffer storage address register 6-1. The buffer storage 10-1 is accessed by the contents of the address register 6-1. The contents (operand data) read out of the buffer storage 10-1 are transferred via the buffer storage output register 7-1 to the execution unit. In this case, the 0 series synchro instruction signal 12-1 produced in response to a 0 series request 11-1 is "0".

Assuming that an instruction having two operands (instruction such as one having an SS format) is set at the instruction register 1, the decoder 2 decodes the instruction code from the instruction register 1 and actuates both operand address generators 3-1 and 3-2. The operand address generator 3-1 actuated by the decoder 2 receives the operand code from the instruction register 1 and calculates the operand address (i.e., a first operand address) to apply it to the buffer storage address register 6-1. The buffer storage 10-1 is accessed by the contents of the address register 6-1. The contents (i.e., a first operand data) read out of the buffer storage 10-1 are transferred via the buffer storage output register 7-1 to the execution unit. The operation of the buffer storage 10-1 is the same as the case of the above one-operand instruction.

While on the other hand, the operand address generator 3-2 receives the operand code from the instruction register 1 and calculates the operand address (i.e., a second operand address) to output it in response to an operand read request. Therefore, the operand address from the operand address generator 3-2 is set at the buffer storage address register 6-2 via the selector 5-2. The contents (i.e., a second operand data (read out of the buffer storage 10-2 are transferred via the buffer storage output register 7-2 to the execution unit.

As above, in the case where a two-operand instruction is set at the instruction register 1, both of the buffer storages 10-1 and 10-2 are used for reading the first and second operands at the same time. In this case, both 0 and 1 series synchro request signals 12-1 and 12-2 produced in response to the 0 and 1 requests 11-1 and 11-2 become "1".

Figure 3:
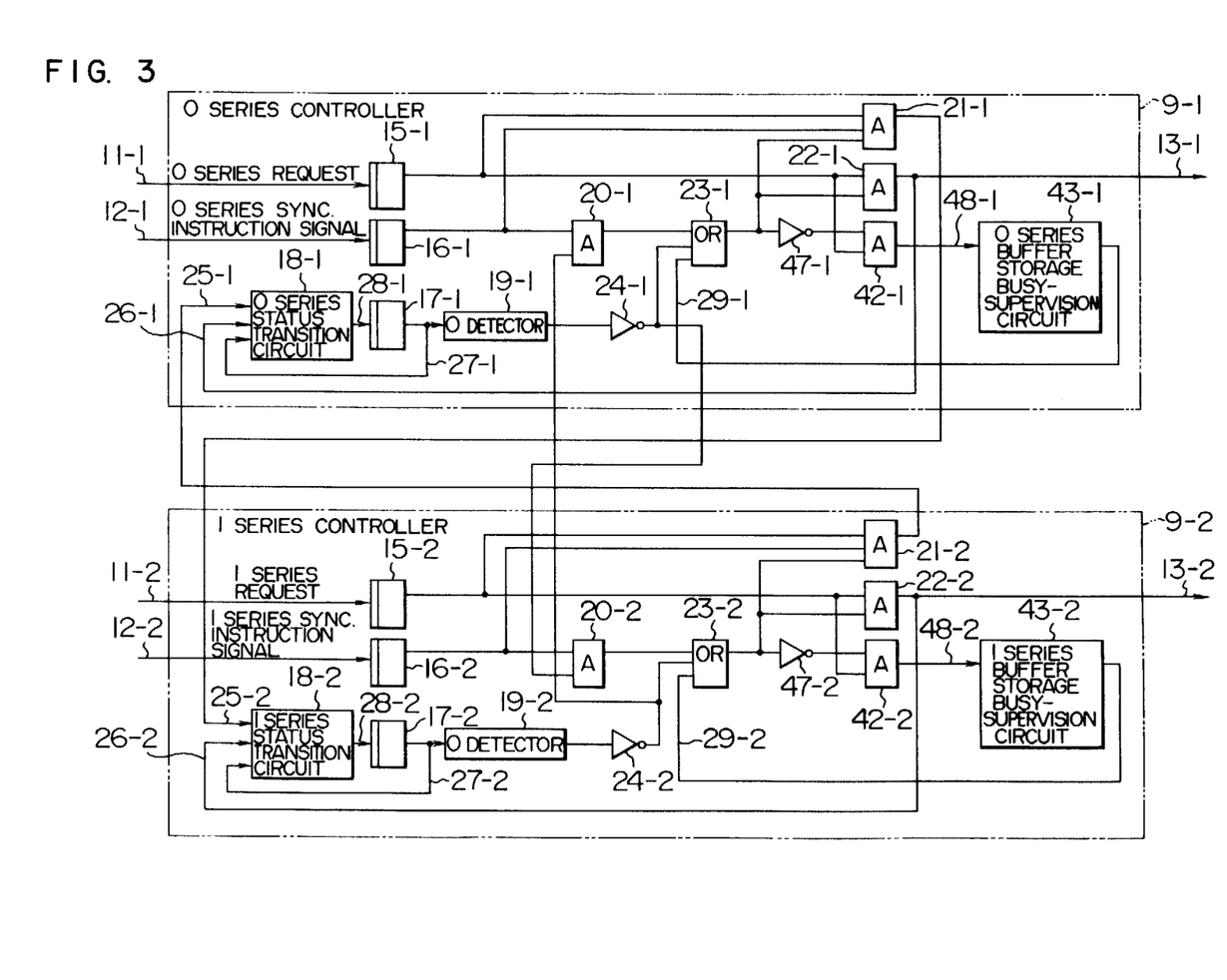
FIG. 3 shows in detail the buffer storage control unit of FIG. 1.
Figure 4:
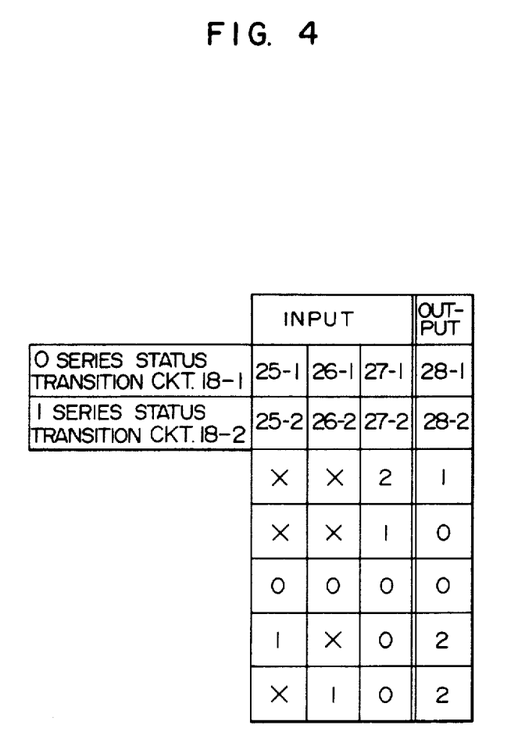
FIG. 4 is a truth table indicating the status transition conditions of the status transition circuit of FIG. 3.

The detail of the buffer storage controller 9 will now be described in connection with FIGS. 3 and 4. In FIG. 3, reference numeral 9-1 represents the 0 series controller, while 9-2 represents the 1 series controller. Both 0 and 1 series controllers 9-1 and 9-2 have the same circuit construction, and the description therefor is directed only to the 0 series.

In FIG. 3, reference numerals 15-1 and 16-1 stand for flip-flops, 21-1, 22-1 and 42-1 for AND gates, 23-1 for a negation gate (inverter) and 17-1 for a register. The register 17-1 constructed of 2 bits and takes three values of 0, 1 and 2. A 0 detector 19-1 detects the value 0 of the register 17-1 and makes its output 0 when the value is detected. A status transition circuit 18-1 outputs a signal 28-1 in accordance with the truth table shown in FIG. 4. Symbol "x" in FIG. 4 indicates that the output is not dependent on the value of "x". A 0 series buffer storage busy-supervision circuit 43-1 is activated by a 0 series buffer storage reference trigger signal 48-1 and supervises the busy status of the 0 series buffer storage 10-1. When the buffer storage 10-1 is busy, a 0 series buffer storage busy signal 29-1 becomes "1". That the buffer storage is busy means that the buffer storage is under a read/write process, address translation, data transference to or from an unrepresented storage of a higher hierarchy, or the like.

The 0 series buffer storage controller 9-1 judges if a 0 series request 11-1 can be received and processed. If possible, at the following cycle after the 0 series request 11-1 is produced, a 0 series buffer storage reference trigger signal 48-1 is rendered "1", while if not possible, a 0 series re-request signal 13-1 is rendered "1".

The operation of the circuit of FIG. 3 will be described mainly with reference to the 0 series controller 9-1.

First, the operation will be described, wherein the 0 series is busy, i.e., the 0 series buffer storage busy signal 29-1 is "1", when a 0 series request 11-1 is produced during "0" of the 0 series synchro instruction signal 12-1. It is here assumed that the value of the register 17-1 is 0 and the 1 series request 11-2 is not produced at that time. At the next cycle after a 0 request is produced, the flip-flop 15-1 turns ON, while the flip-flop 16-1 turns OFF. Since the 0 series busy signal 29-1 is ON, the OR gate 23-1 turns ON, the AND gate 22-1 turns ON, and the AND gate 21-1 turns OFF, thereby producing a 0 series operand re-request 13-1. The 0 series status transition circuit 18-1 receives "0" signal 25-1, "1" signal 26-1 and 0 value signal 27-1, so that a signal 28-1 of a value 2 is outputted. Consequently, at the following cycle, the value of the register 17-1 becomes 2, and thereafter every time a new cycle is effected a transition of 2→1→0 is cyclically carried out. At those cycles while the register 17-1 shows the value 2 or 1, the output of the 0 detector 19-1 becomes "0", the output of the negation gate 24-1 becomes "1" and the output of the OR gate 23-1 becomes "1". Therefore, if another 0 series operand read request 11-1 is produced during the next and second next cycles after the first 0 series request 11-1 is not allowed, the 0 series operand request 11-1 of last occurrence is not allowed irrespective of whether the busy status of the 0 series is released or not. And instead, a 0 series operand read re-request is produced. The first 0 series request not allowed makes, as described previously, the AND gate 21-1 turn OFF because of turning OFF of the 0 series synchro instruction signal. Thus, the input 25-2 to the 1 series status transition circuit is supplied with "0".

On the other hand, if a 1 series request 11-2 is produced during turning ON of the 1 series synchro instruction signal 12-2 and during the cycle while the output of the negation gate 24-1 is "1", then in this case the AND gate 20-2 turns ON, the OR gate 23-2 turns ON, and the AND gate 22-2 turns ON. Therefore, the request is not allowed and a 1 series operand read re-request 13-2 is produced. More specifically, if another 1 series request is produced during the next and second next cycles after the first 0 series request 11-1 is not allowed, it is decided based on the busy status of the 1 series whether the 1 series request is allowed or not during turning OFF of the 1 series synchro instruction signal 12-2. If the 1 series synchro instruction signal 12-2 is ON, then the request is not allowed unconditionally, and a 1 series operand read re-request is produced.

Next, the operation will be described wherein a 0 series request 11-1 is produced during turning ON of the 0 series synchro instruction signal 12-1 and the 0 series is busy. It is here assumed that both values of the registers 17-1 and 17-2 are 0. The operation of the 0 series controller 9-1 after the 0 series request 11-1 is produced is the same as the above-described case wherein the 0 series synchro instruction signal 12-1 is OFF, except that the flip-flop 16-1 and AND gate 21-1 become ON at the next cycle after the 0 series request is produced.

On the other hand, in the 1 series controller 9-2, the input 25-2 to the 1 series status transition circuit 18-2 becomes "1" and the input 27-2 is "1", so that an output 28-2 of a value 2 is outputted. Consequently, similar to the register 17-1, the status of the register 17-2 cyclically transits 2→1→0 each time a new cycle is effected. This means that during the cycle while the value of the register 17-2 is 1 or 2, a 1 series request is not allowed.

As described in the foregoing, without a 0 series request during turning ON of the 0 series synchro instruction signal 12-1, neither of the 0 and 1 series requests 12-1 and 12-2 produced during the next and second next cycles is allowed unconditionally. Instead, the 0 or 1 series operand read re-request 13-1 or 13-2 is produced.

Figure 5A:
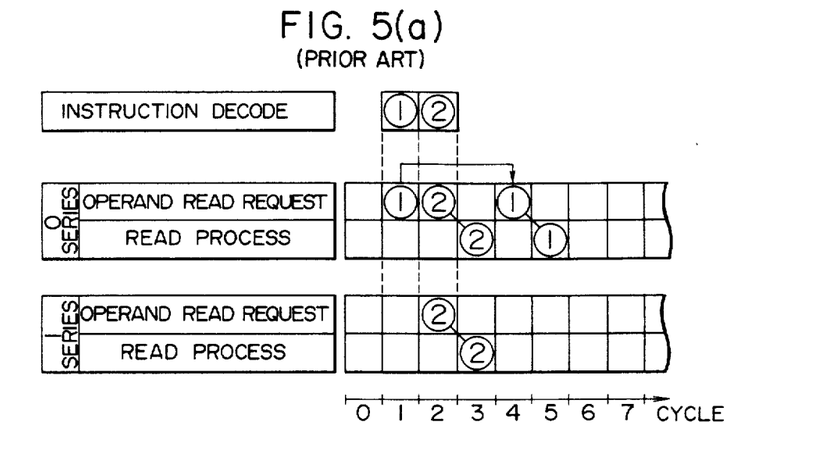
FIGS. 5(a), 5(b) and 6(a), 6(b) are timing charts respectively showing the relationship of sequence between instruction codes and corresponding operand read processes according to the prior art and the present invention.
Figure 5B:
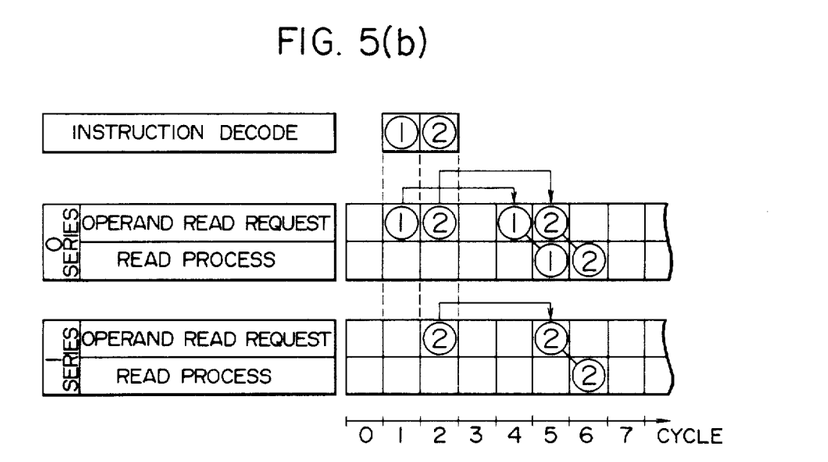
Figure 6A:
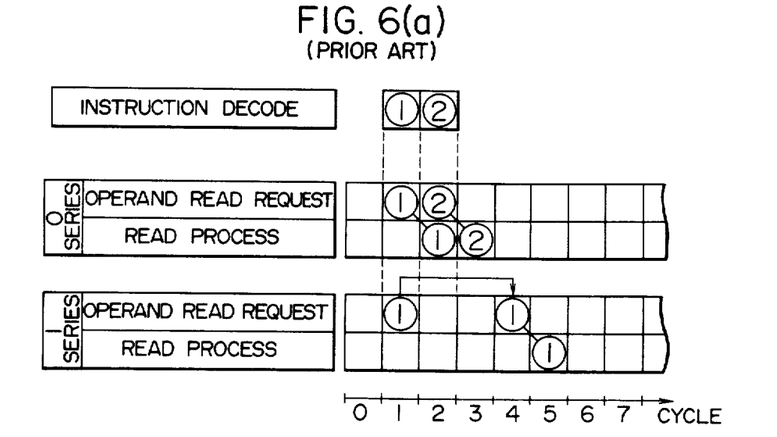
Figure 6B:
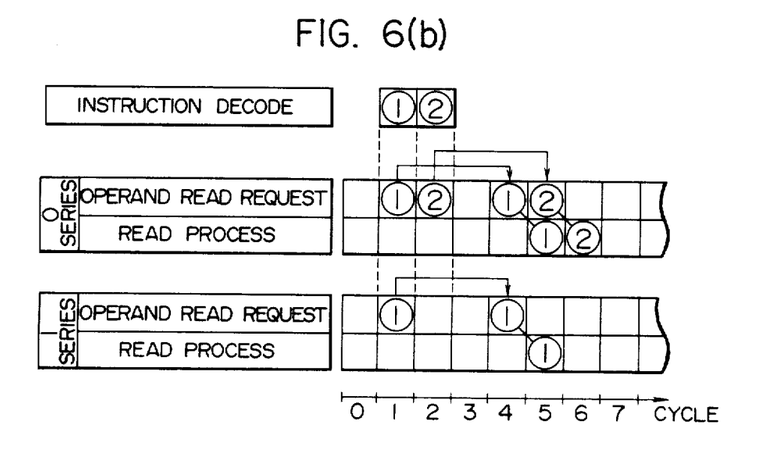

Referring to FIGS. 5 and 6, the relationship of sequence between instruction codes and corresponding operand read processes will be described. In FIGS. 5(a) and 5(b) and FIGS. 6(a) and 6(b), the abscissas indicate time and one scale coQrresponds to one cycle. The ordinates indicate the process. Symbol "" indicates that the process identified by the abscissa is carried out during the cycle. In order to distinguish the instructions, reference numerals 1 and 2 are used which are inserted in symbol "". The arrow means that an operand read request is again produced since the first operand read request has not been allowed.

In FIG. 5, instruction is a one-operand instruction, while instruction 2 is a two-operand instruction. First, consider the case where the 0 series operand read request of instruction 1 is not allowed. FIG. 5(a) shows the processes according to the prior art, while FIG. 5(b) shows the processes according to the present invention.

In the prior art processes shown in FIG. 5(a), the 0 series operand read request of instruction 1 is first produced at cycle 1. At cycle 2, the request is not allowed since the 0 series buffer storage is busy. Thereafter, at cycle 4, a request is again produced to execute the read process at cycle 5. The 0 and 1 series operand read request of instruction 2 are both produced at cycle 2 and processed at cycle 3. In this case, reading the first and second operands of instruction 2 is executed prior to reading the operand of instruction 1 which is to be executed earlier than instruction 2. Therefore, passing of reading operands occurs.

According to the processess of the present invention shown in FIG. 5(b), if the 0 series operand read request of instruction 1 is not allowed, the 0 and 1 series operand read requests of instruction 2 also are not allowed and a request is again produced. The reason why the 1 series request is not allowed is that for a two-operand instruction, as described previously, the 0 and 1 series synchro instruction signals 12-1 and 12-2 become ON. Accordingly as shown in FIG. 5(b), reading the operand of instruction 1 is executed at cycle 5, and reading both first and second operands of instruction 2 is executed at cycle 6. Thus, the order of reference to the buffer storages conforms to that of decoding of the instructions.

FIG. 6 shows the case where instruction 1 is of a two-operand instruction and instruction 2 is of a one-operand instruction. In the prior art processes shown in FIG. 6(a), in spite of the fact that the instructions have been decoded in the order of instruction 1 and instruction 2, the operand read processes are conducted in the order of the first operand of instruction 1, the operand of instruction 2, and the second operand of instruction 1. On the other hand, according to the processes of the present invention shown in FIG. 6(b), after the first and second operands of instruction 1 are read, the process for reading the operand of instruction 2 is conducted.

A method for reading instruction may be such a method additionally providing a buffer storage for exclusive use in reading instructions, or a method using the 1 series buffer storage. In reading instructions, control for the order of reading is not needed, so that any one of the above methods may be applied in embodying the present invention.

According to the present invention, in a data processing apparatus incorporating a pipeline system and having first and second buffer storages each independently accessible wherein the first one is used for an one-operand instruction and the second one for a two-operand instruction, the time sequential order of reading operands in the buffer storages can be arranged in the order of the decoding of the instructions. Programs are generally coded on the assumption that reading of operands are executed in the order of instructions allocated by the programs. Therefore, only by executing the instruction decoding and operand read processes in the order of instructions allocated by the programs, is it possible to realize a data processing apparatus capable of sequential data processing as desired by such programs.

What is claimed is:

1. A data processing apparatus for fetching an operand indicated by an instruction from a storage which includes a main storage and a buffer store which stores a copy of frequently used instructions and data stored in the main storage, comprising:

(a) first and second buffer storages in said buffer store and each being independently accessible;

(b) instruction means for decoding instructions received in sequence and for outputting for each instruction a fetch request and at least one operand address according to whether said instruction is a one-operand instruction or a two-operand instruction, including means responsive to a one-operand instruction for providing said operand address to said first buffer storage and responsive to a two-operand instruction for providing one operand address to said first buffer storage and another operand address to said second buffer storage; and (c) storage control means for controlling the sequence of operation of said instruction means, including means connected to said buffer store for supervising the busy/free status of each of said first and second buffer storages, means for transferring a re-request signal to said instruction means upon a condition that said first buffer storage is busy when the fetch request calls for a one-operand instruction or a condition that at least one of said buffer storages is busy when said fetch request calls for a two-operand instruction, and means for indicating a busy state of said buffer store during a predetermined cycle when said re-request signal is transferred to said instruction means;

wherein said instruction means further includes means responsive to said re-request signal for outputting said fetch request and said operand address once again to said storage control means and said buffer store in the sequence of receipt of instructions for decoding by said instruction means.

2. A data processing apparatus according to claim 1, wherein said instruction means includes:

first hold means for holding said fetch request and said operand address for said first buffer storage in the order of decoding of instructions; second hold means for holding said fetch request and said operand address for said second buffer storage in the order of decoding of instructions; and third hold means for indicating whether said fetch request is for both storages or not; and means for outputting the contents of said first, second and third hold means in the order of decoding of instructions.

3. A data processing apparatus according to claim 2, wherein said storage control means further includes means responsive to the output from said third hold means for identifying whether said fetch request calls for a one-operand instruction or a two-operand instruction.

* * * * *